(12) United States Patent
Wang

(10) Patent No.: US 12,297,907 B2
(45) Date of Patent: May 13, 2025

(54) WATER-PROOF SEALING STRUCTURE FOR VEHICLE ROOF RACK

(71) Applicant: Chiu Kuei Wang, Taichung (TW)

(72) Inventor: Chiu Kuei Wang, Taichung (TW)

(73) Assignee: KING RACK INDUSTRIAL CO., LTD., Taichung (TW)

( * ) Notice: Subject to any disclaimer, the term of this patent is extended or adjusted under 35 U.S.C. 154(b) by 871 days.

(21) Appl. No.: 16/504,790

(22) Filed: Jul. 8, 2019

(65) Prior Publication Data
US 2020/0132194 A1    Apr. 30, 2020

(30) Foreign Application Priority Data

Oct. 30, 2018 (TW) .................................. 107138396

(51) Int. Cl.
*F16B 7/18* (2006.01)
*B60R 9/04* (2006.01)
(Continued)

(52) U.S. Cl.
CPC .................. *F16J 15/06* (2013.01); *B60R 9/04* (2013.01); *F16B 7/182* (2013.01); *F16B 7/042* (2013.01); *Y10T 403/55* (2015.01)

(58) Field of Classification Search
CPC ............. Y10T 403/559; Y10T 403/587; Y10T 403/55; F16B 7/0413; F16B 7/042;
(Continued)

(56) References Cited

U.S. PATENT DOCUMENTS 5,005,892 A * 4/1991 Haugen .................... B60P 3/42
                                                                  296/3
5,261,756 A * 11/1993 Kohn .................... F16B 7/0413
                                                                  403/292
(Continued)

FOREIGN PATENT DOCUMENTS

CH          707265 A2 *   5/2014  .............. E01F 9/623
CN       206590047 U     10/2017
(Continued)

OTHER PUBLICATIONS

Translated Publication of FR 2605687 A1. David, Jean-Rene. Device acting as a connecter for assembling tubes forming a framework for panels. Apr. 29, 1988.*

*Primary Examiner* — Michael P Ferguson
*Assistant Examiner* — Kevin J Baynes
(74) *Attorney, Agent, or Firm* — Ying-Ting Chen; Law Office of Michael Chen

(57) ABSTRACT

A water-proof sealing structure for vehicle roof racks includes a sealing member which includes a first end, a second end and a shank formed between the first and second ends. The first end of the sealing member includes a first sealing portion which seals the inner periphery of a male end of a first pipe of the vehicle roof rack. The second end of the sealing member includes a second sealing portion which seals the opening of the male end and also seals the inner periphery of a female end of a second pipe of the vehicle roof rack. The shank has a positioning hole defined radially therethrough. A bolt extends through the first and second pipes and the positioning hole to connect the male end to the female end. The positioning hole is a tapered hole to allow the bolt to be movable therein.

5 Claims, 4 Drawing Sheets

(51) Int. Cl.
*F16B 7/04* (2006.01)
*F16J 15/06* (2006.01)

(58) Field of Classification Search
CPC ........ F16B 7/046; F16B 7/0406; F16B 7/182; B60R 9/04; B60R 9/045; F16J 15/06
See application file for complete search history.

(56) References Cited

U.S. PATENT DOCUMENTS

| | | | |
|---|---|---|---|
| 6,059,632 A * | 5/2000 | Sassak | A63B 19/00 |
| | | | 446/28 |
| 6,425,508 B1 | 7/2002 | Cole et al. | |
| 6,761,008 B2 * | 7/2004 | Chen | B29C 65/564 |
| | | | 52/309.1 |
| 8,739,493 B2 * | 6/2014 | Carnes | E04C 3/28 |
| | | | 403/294 |
| 2010/0008715 A1 * | 1/2010 | Minowa | F16B 7/0453 |
| | | | 403/203 |

FOREIGN PATENT DOCUMENTS

| | | | |
|---|---|---|---|
| FR | 2605687 A1 * | 4/1988 | ............. E01F 9/623 |
| JP | 2008-101671 A | 5/2008 | |
| KR | 10-2012-0021894 A | 3/2012 | |
| WO | WO-2016100537 A1 * | 6/2016 | |

* cited by examiner

WATER-PROOF SEALING STRUCTURE FOR VEHICLE ROOF RACK

BACKGROUND OF THE INVENTION

1. Fields of the Invention

The present invention relates to a sealing structure, and more particularly, to a water-proof sealing structure for vehicle roof racks.

2. Descriptions of Related Art

The conventional vehicle roof rack generally is assembled by multiple pipes which are formed into desired shapes and lengths so as to be assembled to each other. Generally, the conventional vehicle roof rack is assembled by two half portions, and the two half portions are assembled together by using screws.

U.S. Pat. No. 6,425,508 discloses a load-bearing frame assembly for coupling to a roof of a vehicle, and a sealing member is used to provide better water-proof feature between pipes. The sealing member is located in the male connection end of a pipe, and a screw is used to fix the male and female connection ends. A resilient member is secured to the female connection end of the pipe. However, the sealing member is not properly positioned so that the assemblers have to detect and measure the exact depth and position of the sealing member in the pipes. This will cost a lot of time. Besides, because the sealing members in different pipes are not the same, so that the mounting parts for positioning the sealing members will increase the weight and room that the frame assembly require. This will increase the cost for packing and transportation. In addition, the sealing member includes a positioning hole which has a fixed inner diameter, and the positioning hole cannot provide micro-adjustment feature when assembling the frame assembly.

The present invention intends to provide a water-proof sealing structure for vehicle roof racks and the water-proof sealing structure is easily installed and keeps water or moisture from entering the pipes.

SUMMARY OF THE INVENTION

The present invention relates to a water-proof sealing structure for vehicle roof racks, and comprises a first pipe having a male end which includes a first hole defined through the wall thereof. A second pipe has a female end which includes a second hole defined through the wall thereof. The male end is inserted into the female end.

A sealing member includes a first end, a second end and a shank formed between the first and second ends. The first end of the sealing member has at least one first sealing portion which seals the inner periphery of the male end. The second end of the sealing member has at least one second sealing portion which seals the opening of the male end and seals the inner periphery of the female end. The shank includes a positioning hole defined radially therethrough, wherein the positioning hole is an elongate hole. At least one bolt extends through the first and second holes and the positioning hole to connect the male end to the female end. The at least one bolt includes a head and a threaded rod which extends from the head, and the distal end of the threaded rod extends through the positioning hole.

Preferably, the first hole includes first threads defined in the inner periphery thereof, and the second hole includes second threads defined in the inner periphery thereof.

Preferably, the at least one first sealing portion includes multiple layers of discs which are arranged in a cone shape.

Preferably, the at least one second sealing portion includes multiple layers of discs which are arranged in a cone shape.

Preferably, the diameter of the at least one first sealing portion is smaller than that of the at least one second sealing portion.

Preferably, the shank includes a third sealing portion formed thereto. The positioning hole is located between the at least one first sealing portion and the third sealing portion so as to form a room between the at least one first sealing portion and the third sealing portion.

Preferably, the positioning hole is an elongate hole.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
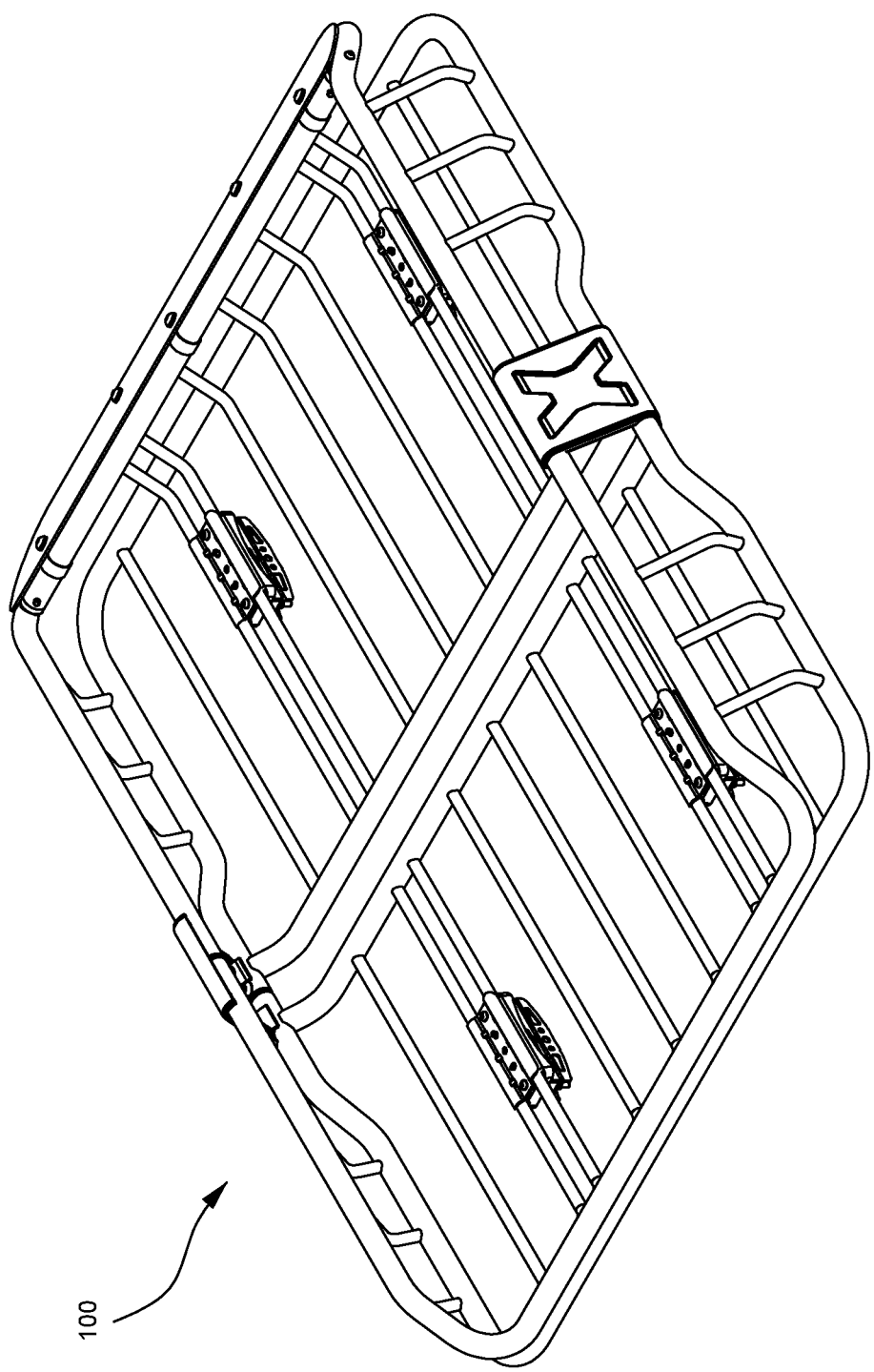
FIG. 1 is a perspective view to show the vehicle roof rack with the water-proof sealing members of the present invention installed to the vehicle roof rack.
Figure 2:
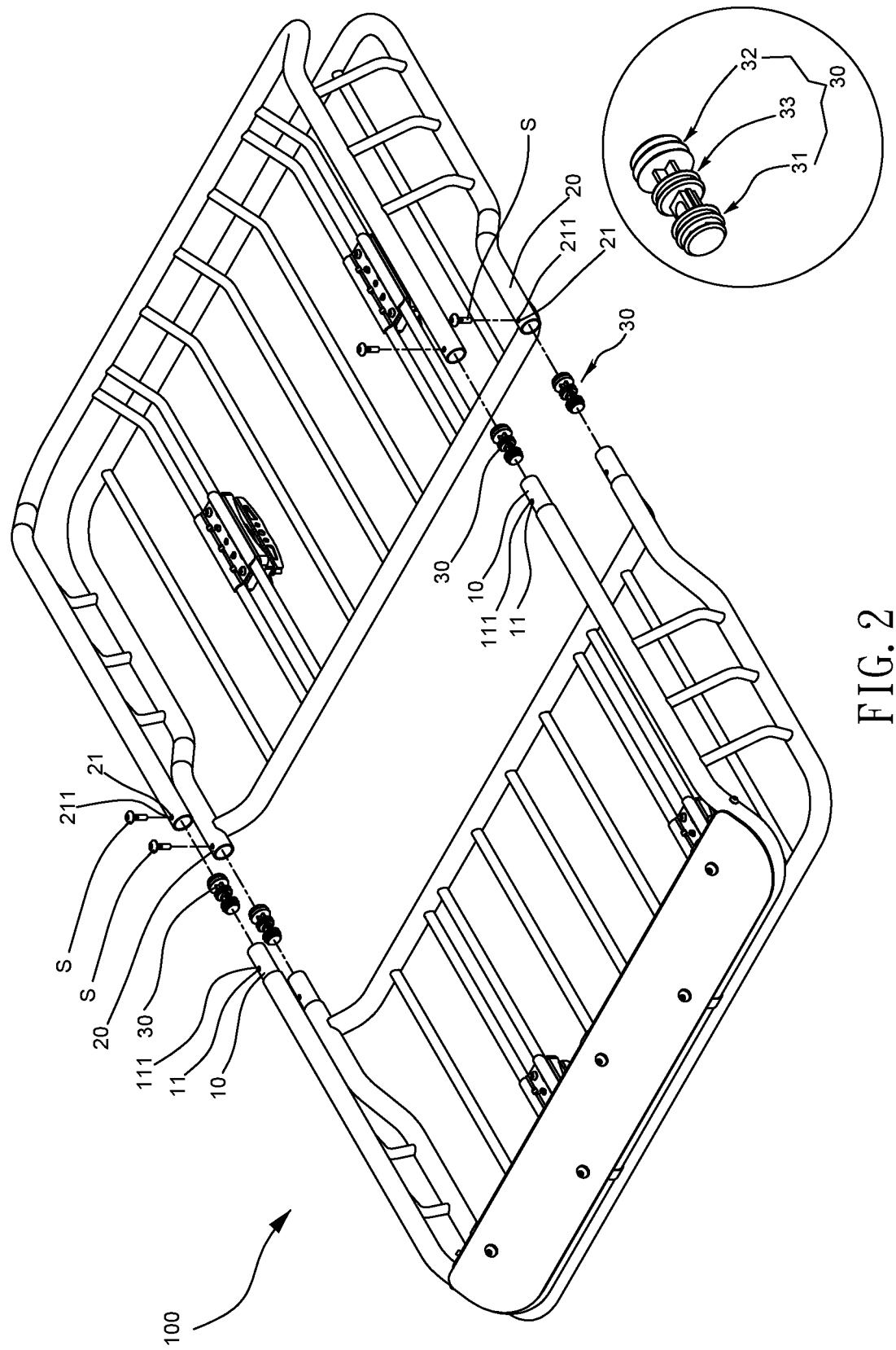
FIG. 2 is an exploded view of a vehicle roof rack and the water-proof sealing members of the present invention installed to the vehicle roof rack.
Figure 3:
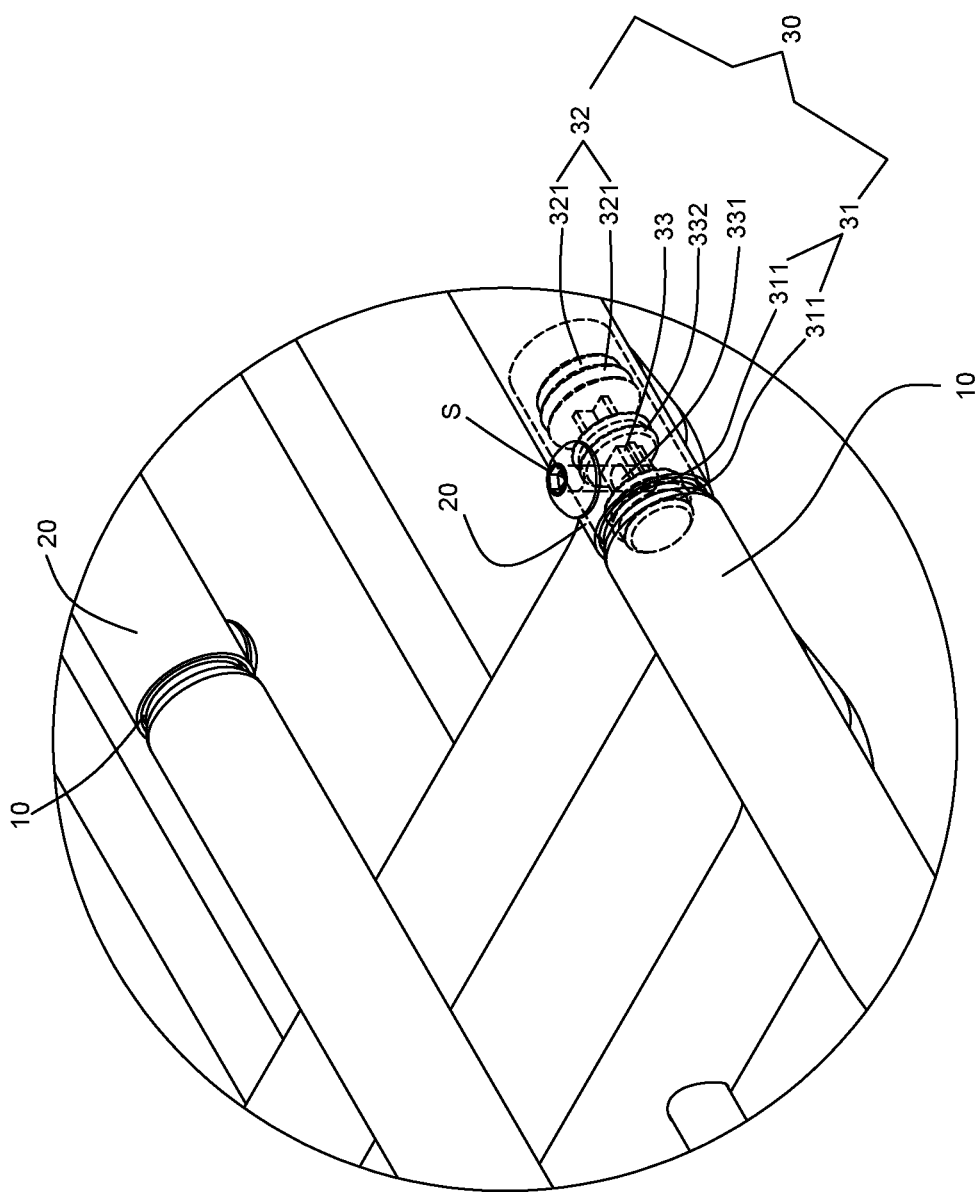
FIG. 3 is an enlarged view to show that the water-proof sealing members of the present invention is installed between the first and second pipes of the vehicle roof rack.
Figure 4:
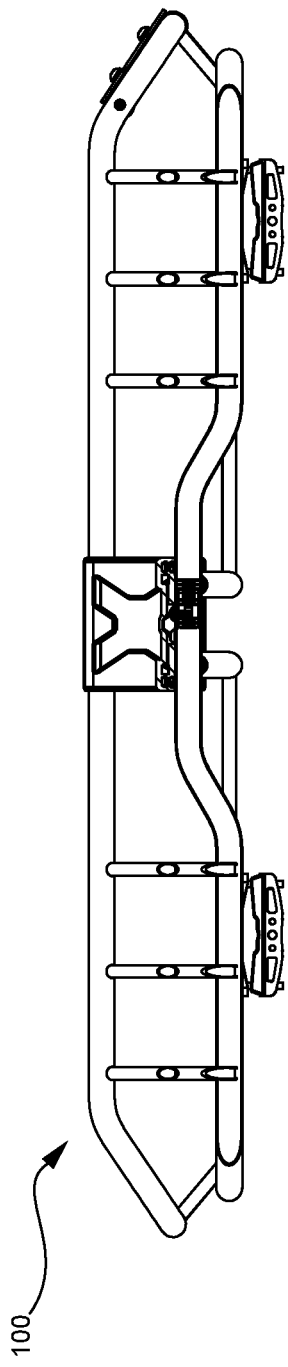
FIG. 4 is a side view to show the of the vehicle roof rack with the water-proof sealing member of the present invention.
Figure 5:
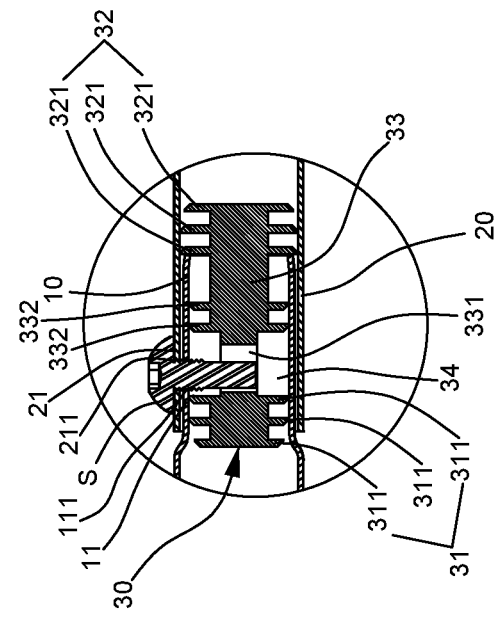
FIG. 5 is a cross sectional view to show the connection of the water-proof sealing member located between the first and second pipes ad positioned by the bolt.

Referring to FIGS. 1 to 5, the water-proof sealing structure for a vehicle roof rack 100 or a bicycle carriage rack of the present invention comprises a first pipe having a male end 10 which includes a first hole 11 defined through the wall thereof. A second pipe has a female end 20 which includes a second hole 21 defined through the wall thereof. The male end is inserted into the female end. Preferably, the first and second pipes are made of metal. The first hole 11 includes first threads 111 defined in the inner periphery thereof, and the second hole 21 includes second threads 211 defined in the inner periphery thereof.

A sealing member 30 includes a first end 31, a second end 32 and a shank 33 formed between the first and second ends 31, 32. The first end 31 of the sealing member 30 has at least one first sealing portion 311 which seals the inner periphery of the male end 10. The second end 32 of the sealing member 30 has at least one second sealing portion 321. The diameter of the at least one first sealing portion 311 is smaller than that of the at least one second sealing portion 321. The at least one second sealing portion 31 seals the opening of the male end 10 and seals the inner periphery of the female end 20. Preferably, the at least one first sealing portion 311 includes multiple layers of discs which are in contact with the inner periphery of the male end 10. The outer peripheries of the multiple layers of discs of the at least one first sealing portion 311 are arranged in a cone shape. The at least one second sealing portion 321 includes multiple layers of discs which close the opening of the male end 10 and are in contact with the inner periphery of the female end 20. The outer peripheries of the multiple layers of discs of the at least one second sealing portion 321 are arranged in a cone shape.

The shank 33 includes a positioning hole 331 defined radially therethrough. The positioning hole 331 is an elongate hole. At least one bolt "S" extends through the first and second holes 11, 21 and the positioning hole 331 to connect the male end 10 to the female end 20. The at least one bolt "S" includes a head and a threaded rod which extends from the head, and the distal end of the threaded rod is located within the positioning hole 331. The shank 33 includes a third sealing portion 332 formed thereto. The positioning hole 331 is located between the at least one first sealing portion 311 and the third sealing portion 332 so as to form a room 34 between the at least one first sealing portion 311 and the third sealing portion 332. Therefore, the water entering to the first and second pipes is restricted within the room 34 and does not flows into the first and second pipes.

When water enters into the first pipe and/or the second pipe along the at least one bolt "S", the water will be isolated within the room 34 so that the water does not randomly flow to corrode the first and second pipes. The installation of the sealing member 30 is easy and the users do not need to use detection equipment or other tools to check the exact depth and position of the sealing member in the pipes as mentioned in the prior art so as to save installation time and cost.

Furthermore, because the positioning hole 331 is an elongate hole, and the first and second holes 11, 21 of the vehicle roof racks 100 of different brands may not be perfectly aligned with each other, this allows for the at least one bolt "S" to adjustably extend through the first and second holes 11, 21 and the positioning hole 331, so as to connect the male end 10 to the female end 20.

While we have shown and described the embodiment in accordance with the present invention, it should be clear to those skilled in the art that further embodiments may be made without departing from the scope of the present invention.

What is claimed is:

1. A sealing structure for vehicle roof racks, comprising:
 a first pipe having a male end which includes a first hole defined through a wall thereof;
 a second pipe having a female end which includes a second hole defined through a wall thereof, an outer diameter of the male end of the first pipe being smaller than an inner diameter of the female end of the second pipe, the male end being inserted into the female end;
 a sealing member having a first end, a second end and a shank formed between the first and second ends, the first end of the sealing member having at least one first sealing portion which seals an inner periphery of the male end, the at least one first sealing portion comprising at least one radially extending flange extending from the first end that contacts an entire circumference of the inner periphery of the male end to seal the inner periphery of the male end, the second end of the sealing member having at least one second sealing portion which seals an opening of the male end and seals an inner periphery of the female end, the at least one second sealing portion comprising at least one radially extending flange extending from the second end that abuts and covers the opening in the male end to seal the opening in the male end and contacts an entire circumference of the inner periphery of the female end to seal the inner periphery of the female end, the shank having a positioning hole defined radially therethrough, the shank including a third sealing portion formed thereto, the third sealing portion comprising at least one radially extending flange extending from the shank that contacts an entire circumference of the inner periphery of the male end adjacent the opening of the male end, the positioning hole located between the at least one first sealing portion and the third sealing portion so as to form a room between the at least one first sealing portion and the third sealing portion, and
 at least one bolt extending through the first and second holes and the positioning hole to connect the male end to the female end, the at least one bolt including a head and a threaded rod which extends from the head, a distal end of the threaded rod extending through the positioning hole, wherein the positioning hole is an elongate slot that is elongated along a longitudinal axis of the sealing member and concentric with longitudinal axes of the first and second pipes, so as to facilitate alignment and provide for easier assembly of the bolt within the first and second holes and the positioning hole.

2. The sealing structure for vehicle roof racks as claimed in claim 1, wherein the first hole includes first threads defined in an inner periphery thereof, the second hole includes second threads defined in an inner periphery thereof.

3. The sealing structure for vehicle roof racks as claimed in claim 1, wherein the at least one first sealing portion includes multiple radially extending flanges which are arranged in a cone shape.

4. The sealing structure for vehicle roof racks as claimed in claim 1, wherein the at least one second sealing portion includes multiple layers radially extending flanges which are arranged in a cone shape.

5. The sealing structure for vehicle roof racks as claimed in claim 1, wherein a diameter of the at least one first sealing portion is smaller than that of the at least one second sealing portion.

* * * * *